(12) United States Patent
Larsen

(10) Patent No.: US 8,167,001 B2
(45) Date of Patent: May 1, 2012

(54) DOME-LOADED PRESSURE REGULATORS

(75) Inventor: Todd William Larsen, Milaca, MN (US)

(73) Assignee: Tescom Corporation, Elk River, MN (US)

( * ) Notice: Subject to any disclaimer, the term of this patent is extended or adjusted under 35 U.S.C. 154(b) by 0 days.

(21) Appl. No.: 12/963,476

(22) Filed: Dec. 8, 2010

(65) Prior Publication Data
US 2011/0073198 A1    Mar. 31, 2011

Related U.S. Application Data

(63) Continuation of application No. 12/683,268, filed on Jan. 6, 2010, now Pat. No. 7,870,869, which is a continuation of application No. 11/350,601, filed on Feb. 9, 2006, now Pat. No. 7,669,610.

(51) Int. Cl.
    *F16K 31/122* (2006.01)
(52) U.S. Cl. ........................................... 137/883
(58) Field of Classification Search ............. 137/505.14, 137/505.38, 508, 509, 883, 885, 906; 251/63, 251/63.5
See application file for complete search history.

(56) References Cited

U.S. PATENT DOCUMENTS

| | | |
|---|---|---|
| 2,002,450 A | 5/1935 | George |
| 2,590,368 A | 3/1952 | Beck |
| 2,600,137 A | 6/1952 | Teague, Jr. |
| 3,064,675 A | 11/1962 | Johnson et al. |
| 3,211,175 A | 10/1965 | Replogle |
| 3,664,369 A | 5/1972 | Johnson |
| 3,955,597 A | 5/1976 | Oneyama et al. |
| 4,476,888 A | 10/1984 | Lachmann et al. |
| 4,667,695 A | 5/1987 | Gold et al. |
| 5,309,934 A | 5/1994 | Jaeger |
| 5,379,761 A | 1/1995 | Schuler |
| 5,452,741 A | 9/1995 | Tomita et al. |
| 5,501,247 A | 3/1996 | Miller |
| 5,826,613 A | 10/1998 | Schalk |
| 6,006,780 A | 12/1999 | Tseng et al. |

(Continued)

FOREIGN PATENT DOCUMENTS
EP    0010117    4/1980
(Continued)

OTHER PUBLICATIONS

Japanese Office Action "Notice of Reasons for Rejection", issued in connection with Japanese Patent Application No. 2008-554251, mailed on Sep. 20, 2011, 3 pages.

(Continued)

*Primary Examiner* — John Fox
(74) *Attorney, Agent, or Firm* — Hanley, Flight & Zimmerman, LLC

(57) ABSTRACT

Dome-loaded pressure regulators are disclosed. An example pressure regulator includes a body having a pressure inlet and first and second pressure outlets and a first dome-loaded pressure regulating valve fluidly coupled to the pressure inlet, the first pressure outlet, and a first control pressure. The first dome-loaded pressure regulating valve includes a first piston having a transverse bore defining a fluid path through the first piston to fluidly couple the pressure inlet to the first pressure outlet and configured to engage a first valve seat and to respond to the first control pressure to control the flow of fluid between the pressure inlet and the first pressure outlet via the first valve seat. The example pressure regulator includes a second dome-loaded pressure regulating valve fluidly coupled to the pressure inlet, the second pressure outlet, and a second control pressure.

23 Claims, 2 Drawing Sheets

U.S. PATENT DOCUMENTS

| | | |
|---|---|---|
| 6,170,519 B1 | 1/2001 | Carroll et al. |
| 6,257,837 B1 | 7/2001 | Adams et al. |
| 6,412,750 B1 | 7/2002 | Jun et al. |
| 6,796,323 B1 | 9/2004 | Taylor |
| 7,059,579 B2 | 6/2006 | Stevenson |
| 7,669,610 B2 | 3/2010 | Larsen |
| 7,870,865 B2 | 1/2011 | Mattison |
| 2004/0007269 A1 | 1/2004 | Larsen |
| 2004/0216781 A1 | 11/2004 | Larsen |

FOREIGN PATENT DOCUMENTS

| | | |
|---|---|---|
| JP | 58-113107 | 8/1983 |
| JP | 64-070806 | 3/1989 |

OTHER PUBLICATIONS

Patent Cooperation Treaty, "International Search Report," issued by the International Searching Authority in connection with related PCT application No. PCT/US2007/001787, mailed Jul. 31, 2007 (3 pages).

Patent Cooperation Treaty, "Written Opinion of the International Searching Authority," issued by the International Searching Authority in connection with related PCT application No. PCT/US2007/001787, mailed Jul. 31, 2007 (5 pages).

United States Patent and Trademark Office, "Final Office Action," issued in connection with U.S. Appl. No. 11/350,601, on Nov. 20, 2008 (5 pages).

United States Patent and Trademark Office, "Non-Final Office Action," issued in connection with U.S. Appl. No. 11/350,601, on May 15, 2008 (5 pages).

United States Patent and Trademark Office, "Notice of Allowance," issued in connection with U.S. Appl. No. 11/350,601, on Oct. 7, 2009 (6 pages).

United States Patent and Trademark Office, "Non-Final Office Action," issued in connection with U.S. Appl. No. 11/350,601, on Jul. 2, 2009 (6 pages).

United States Patent and Trademark Office, "Non-Final Office Action," issued in connection with U.S. Appl. No. 11/350,601, on Mar. 4, 2009 (7 pages).

United States Patent and Trademark Office, "Advisory Action," issued in connection with U.S. Appl. No. 11/350,601, on Feb. 6, 2009 (3 pages).

United States Patent and Trademark Office, "Non-Final Office Action," issued in connection with U.S. Appl. No. 11/350,601, on Mar. 13, 2008 (6 pages).

United States Patent and Trademark Office, "Restriction Requirement," issued in connection with U.S. Appl. No. 12/683,268, mailed on Jul. 15, 2010, 6 pages.

United States Patent and Trademark Office, "Notice of Allowance," issued in connection with U.S. Appl. No. 12/683,268, mailed on Sep. 9, 2010, 5 pages.

DOME-LOADED PRESSURE REGULATORS

RELATED APPLICATIONS

This patent arises from a continuation of U.S. patent application Ser. No. 12/683,268, filed on Jan. 6, 2010, which arises from a continuation of U.S. patent application Ser. No. 11/350,601, filed on Feb. 9, 2006, now U.S. Pat. No. 7,669,610, which are hereby incorporated herein by reference in their entireties.

FIELD OF THE DISCLOSURE

The present disclose relates generally to pressure regulators and, more particularly, to dome-loaded pressure regulators.

BACKGROUND

Many process control systems use pressure regulators to control the pressure of a process fluid, to control a pressure applied to a process control device (e.g., an actuator), etc. Pressure reducing regulators are commonly used to receive a relatively high pressure fluid source and output a relatively lower regulated output fluid pressure. In this manner, despite the pressure drop across the regulator, a pressure reducing regulator can provide a relatively constant output fluid pressure for a wide range of output loads (i.e., flow requirements, capacity, etc.).

Some pressure reducing regulators commonly referred to as dome-loaded pressure reducing regulators utilize a dome or pilot stage that receives a control pressure (e.g., a setpoint pressure or desired output pressure). The control pressure in the dome or pilot stage typically drives a sensor (e.g., a piston) which, in turn, drives a valve stem and its plug against a bias spring toward or away from a valve seat so that the output pressure of the regulator substantially equals the control pressure.

However, such dome-loaded regulator designs typically use a separate piston or sensor and valve plug/stem assembly. Due to the separate piston and valve plug/stem assemblies, these types of regulators are prone to overshooting/undershooting a target output pressure and/or may produce an oscillating output pressure. In particular, because the piston is not mechanically joined to the valve stem, the piston can separate from the valve stem/plug assembly resulting in a transitory or momentary loss of control over the position of the plug relative to the seat. As a result, these types of pressure reducing regulator designs may produce unstable (overshooting, undershooting, oscillating, etc.) output pressures in response to rapid changes in the dome pressure (i.e., the control pressure). For example, in some known applications, control pressure or dome pressure is supplied or controlled via fast acting solenoid valves, which produce rapid pressure changes in the dome and, thus, aggravate the above-described stability problem associated with these known dome-loaded regulators. In addition to the stability issues associated with known dome-loaded pressure reducing regulator designs, the above-described dome-loaded pressure reducing regulators utilize a relatively large number of parts, which tends to increase the material and maintenance cost of the regulators as well as the likelihood of regulator failure.

A pressure reducing regulator having relatively few moving parts and a substantially unitary piston or sensor and valve plug assembly is described in U.S. Patent Publication No. 2004/0007269, the entire disclosure of which is incorporated herein by reference. The pressure reducing regulator described in this patent application publication is an in-line pressure reducing regulator that does not utilize a pilot stage or dome to control output pressure and, instead, uses springs to establish a predetermined output pressure. In addition to reducing the number of moving parts, the substantially unitary piston or sensor and valve plug assembly also eliminates the possibility of the valve plug from separating from the piston/sensor, as can occur with the dome-loaded regulator designs noted above.

Still further, in some applications it is desirable to provide multiple pressure outputs (which may be different pressure values) derived from a single source pressure. Commonly, such multiple output pressure applications are implemented by fluidly coupling two or more pressure reducing regulator assemblies, such as the dome-loaded regulators described above, via a manifold and/or tubing. However, such multiple output regulator assemblies are typically expensive to assemble, bulky, heavy, difficult to maintain, etc.

SUMMARY

Figure 1:
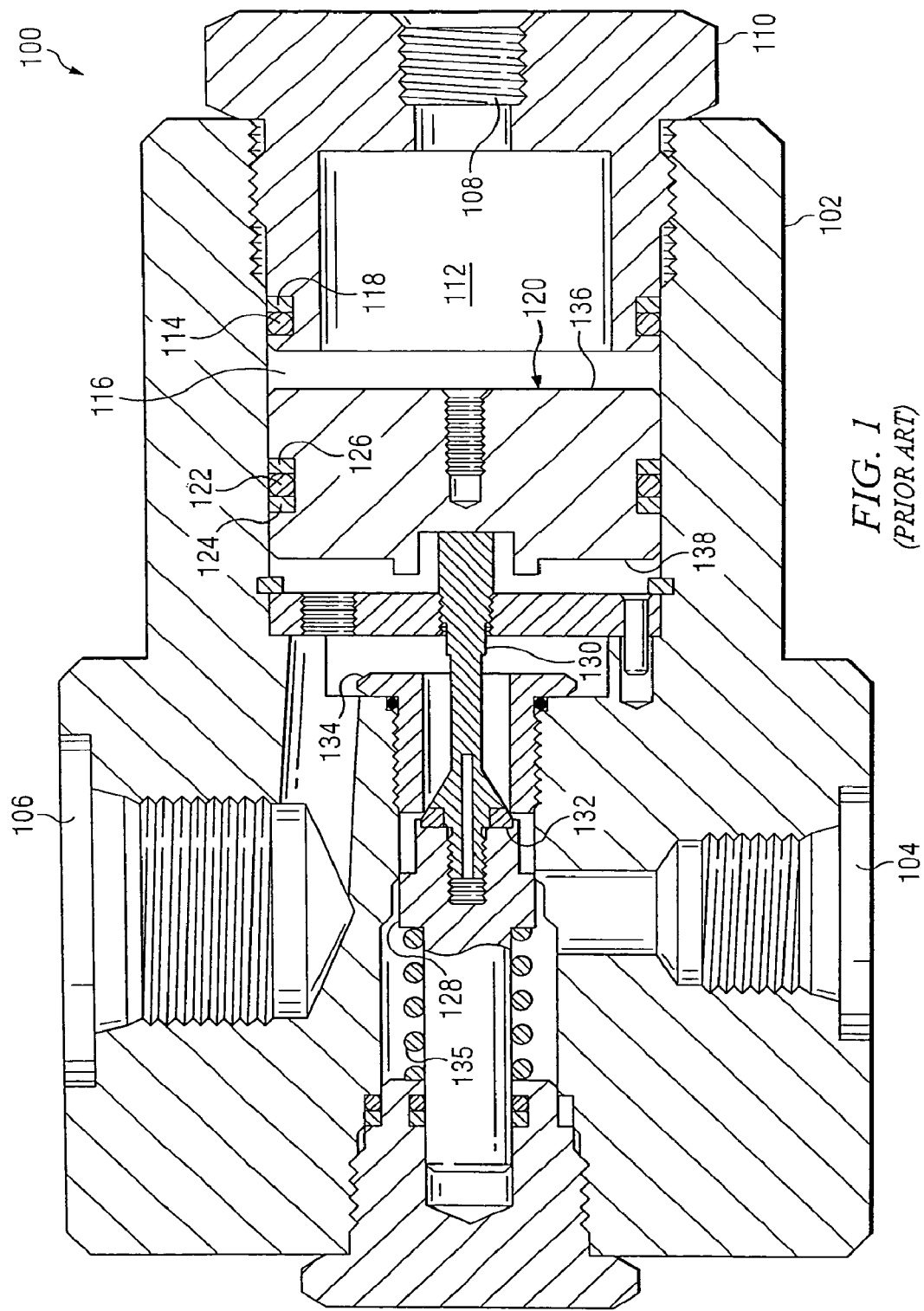
FIG. 1 is cross-sectional view of a known dome-loaded pressure reducing regulator.

An example pressure regulator includes a body having a pressure inlet and first and second pressure outlets and a first dome-loaded pressure regulating valve fluidly coupled to the pressure inlet, the first pressure outlet, and a first control pressure. The first dome-loaded pressure regulating valve includes a first piston having a transverse bore defining a fluid path through the first piston to fluidly couple the pressure inlet to the first pressure outlet and configured to engage a first valve seat and to respond to the first control pressure to control the flow of fluid between the pressure inlet and the first pressure outlet via the first valve seat. The example pressure regulator includes a second dome-loaded pressure regulating valve fluidly coupled to the pressure inlet, the second pressure outlet, and a second control pressure.

DETAILED DESCRIPTION

In general, the example multiple output dome-loaded pressure reducing regulator described herein provides one regulator body that holds multiple pressure regulating valves. Each of the pressure regulating valves provides an independent pressure output or outlet and the independent pressure outputs are derived from a single pressure source inlet of the regulator body.

Additionally, in contrast to some known dome-loaded the pressure regulating valves, the example multiple output pressure reducing regulator described herein utilize pressure regulating valves having a substantially unitary or integrated piston or sensor and valve assembly that substantially reduces or eliminates output pressure instabilities (e.g., overshooting, undershooting, oscillation, etc.) such as those that may result from rapid changes in dome or control pressure. The integrated piston or sensor and valve assembly also serves to reduce the number of parts needed to implement the pressure regulating valves in comparison to some known pressure regulating valves, thereby enabling a more compact design, improved reliability, and lower costs.

Thus, the example integrated multiple output regulator configuration described herein provides a multiple output regulator assembly having a single regulator body that eliminates the need for numerous fittings, tubing, bulky and expensive manifolds, etc., as was required for some known multiple output regulator designs. Further, the pressure regulating valves used to implement the example multiple output regulator have fewer internal components. As a result, the example multiple output regulator assembly described herein may provide lower manufacturing/fabrication costs in addition to lower maintenance costs due to the improved reliability that results from having fewer overall components.

Before discussing the example multiple output pressure reducing regulator of FIG. 2, a known dome-loaded pressure reducing regulator 100 is first described in connection with FIG. 1. The known pressure reducing regulator 100 of FIG. 1 includes a body 102 having an inlet 104, an outlet 106, and a pilot or control pressure input 108. A plug or bonnet 110 is threaded into the body 102 to form a chamber or dome space 112. An o-ring 114 forming a seal against an inner passage 116 of the body 102 is backed by a ring 118 to prevent extrusion of the o-ring 114 between the bonnet 110 and the body 102. A piston or sensor 120 is slidably engaged with the passage 116 and includes an o-ring 122 and backing rings 124 and 126 to form a seal against the passage 116. The piston 120 contacts a valve assembly 128 via a shaft 130 of a plug 132. The plug 132 is urged or biased toward or against a seat 134 via a spring 135.

In operation, a desired control pressure is applied to the pilot input 108 and, thus, to the piston 120. If the pressure at the outlet 106 is less than the control pressure, the piston 120 is displaced toward the valve seat 134 to drive the plug 132 away from the seat 134. As a result, the restriction between the inlet 104 and the outlet 106 decreases to enable the pressure at the outlet 106 to increase. As the pressure at the outlet 106 increases, the amount of pressure urging the piston 120 away from the valve seat 134 increases. When the pressure applied to a first face 136 of the piston 120 (i.e., the pressure at the pilot inlet 108) is substantially equal to the pressure applied to a second face 138 of the piston 120 (i.e., the pressure at the outlet 106), the piston 120 will remain relatively stationary within the passage 116 and the pressure at the outlet 106 will remain substantially constant and equal to the pressure at the pilot input 108.

However, the known dome-loaded pressure reducing regulator 100 of FIG. 1 is susceptible to output pressure instability. For example, in some applications, the dome pressure supply (i.e., the pressure applied at the pilot input 108) to the regulator 100 is controlled using two solenoid valves (neither of which are shown). One solenoid valve opens to introduce air pressure into the dome space 112 via the pilot input 108 and the other solenoid valve bleeds pressure out of the dome space 112 via the pilot input 108. While such a solenoid configuration provides a fast acting method of introducing high-pressure air into the regulator dome space 112, the configuration is relatively susceptible to instability (e.g., overshooting, undershooting, oscillations, etc.). More specifically, the rapid introduction of air (e.g., the introduction of a quick burst of air) into the dome space 112 may cause the regulator 100 to open quickly to a maximum flow condition, which then causes the output pressure of the regulator 100 to overshoot. In response to the output pressure overshoot, the valve 128 in the regulator 100 closes rapidly, which causes the regulator output pressure to undershoot the desired control pressure. Thus, this instability can result in a succession of pressure overshoots and undershoots or continuous oscillation of the regulator output pressure.

Figure 2:
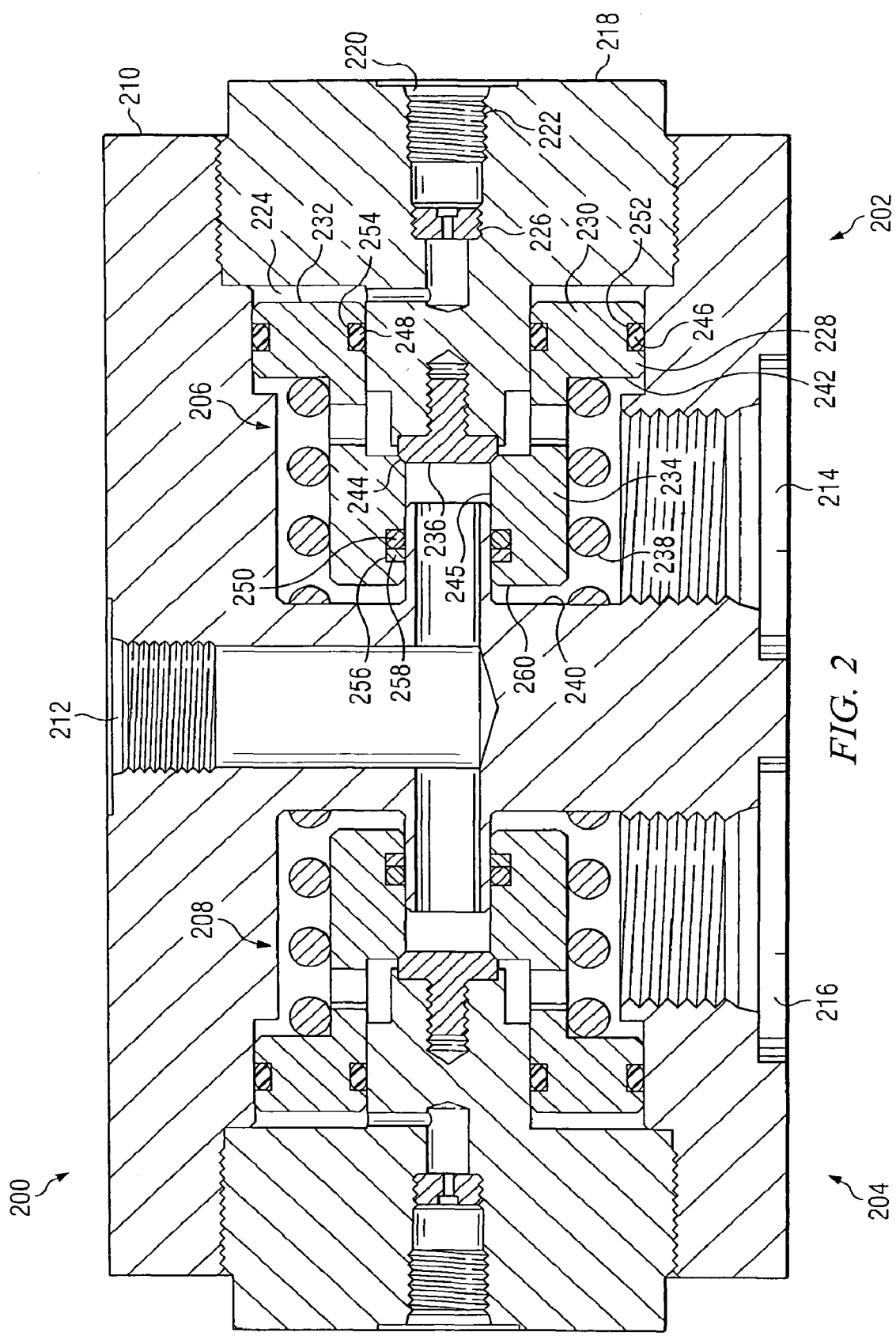
FIG. 2 is a cross-sectional view of an example dual output dome-loaded pressure reducing regulator.

FIG. 2 is a cross-sectional view of an example dual output dome-loaded pressure reducing regulator 200. The example dual output dome-loaded pressure reducing regulator 200 includes first and second pressure reducing regulators 202 and 204 having respective pressure reducing valve assemblies 206 and 208. As shown in FIG. 2, the regulators 202 and 204 are disposed within a single substantially unitary body 210, which may be made of metal such as, for example, brass, stainless steel, or any other metal or material suitable for the intended application of the pressure reducing regulator 200. The body 210 includes a single pressure inlet 212, which provides a pressure source to the regulators 202 and 204 and independent multiple or dual pressure outlets or outputs 214 and 216, corresponding to the respective first and second regulators 202 and 204.

Turning in detail to the first regulator 202, a bonnet or cap 218 is threadingly and sealingly engaged with the body 210. The bonnet 218 provides a pilot or pressure control inlet or input 220, which forms a fluid passage 222 to a chamber or dome space 224. As depicted in the example of FIG. 2, a fluid restrictor 226 may be interposed in the fluid path between the pressure control inlet 220 and the chamber 224.

A sensor or piston 228 slidably engaged with the body 210 is fluidly coupled to the pressure inlet 212, the pressure outlet 214 and the pressure control input 220 via the chamber 224 and the passage 222. The piston 228 has a first portion 230 having a surface 232 that receives a pressure (i.e., the pressure in the chamber or dome space 224) via the pressure control input 220. Additionally, the piston 228 has a second portion 234 configured to contact a valve seat 236 and to control the flow of fluid from the pressure inlet 212 to the pressure outlet 214 in response to the pressure applied to the surface 232 of the piston 228 via the pressure control input 220. In contrast to some known dome-loaded pressure reducing regulators and regulating valves, the first and second portions 230 and 234 of the piston or sensor 228 are fixed together (i.e., cannot separate during operation of the valve 206) and, thus, form a substantially one-piece or unitary member.

The valve seat 236 may be a plug-shaped member made substantially of a plastic material, or any other material that is relatively softer than the material composing the piston 228. A spring 238 disposed between a seat portion 240 of the body 210 and a shoulder 242 of the piston 228 biases an annular surface 244 of a central bore 245 of the piston 228 toward or into sealing engagement or contact with the valve seat 236. A plurality of circumferential seals (e.g., o-rings) 246, 248, and 250 disposed in respective annular channels or grooves 252, 254, and 256 sealingly engage the body 210 and the bonnet 218. The seal 250 further includes a backing ring 258 to inhibit or prevent extrusion of the seal 250 from its groove 256.

In operation, a control pressure (e.g., a desired output pressure) is applied to the pilot or pressure control input 220. The control pressure then pressurizes the dome space or chamber 224 via the fluid restrictor 226. In this manner, the fluid restrictor 226 prevents an overly rapid increase (or decrease) of the pressure applied to the surface 232 of the piston 228 and, thus, tends to substantially reduce or eliminate pressure instabilities (e.g., overshooting, undershooting, oscillation, etc.) at the outlet 214. For example, when solenoid valves (not shown) are used to increase (i.e., load) or decrease the pressure in the dome space 224, the fluid restrictor 226 slows the flow of air to/from the dome space 224 to the solenoid valves, which slows the movement of the piston 228 to prevent the piston 228 and, thus, the pressure at the outlet 214 from oscillating or cycling about a desired output pressure.

During operation, the control pressure applied to the piston surface 232 via the inlet 220 urges the piston 228 against the force of the spring 238 to move the annular surface 244 away from the seat 236, which decreases the restriction between the inlet 212 and the outlet 214 to enable the pressure at the outlet 214 to increase. As the pressure at the outlet 214 increases, the pressure against the shoulder 242 and surface 260 of the piston urges the piston 228 against the pressure in the dome or chamber 224 to move the annular surface 244 toward the seat 236, which increases the restriction between the inlet 212 and the outlet 214 to enable the pressure at the outlet 214 to decrease (or to stop increasing). When the pressures urging the annular surface 244 away from the seat 236 and toward the seat 236 are in balance, the pressure at the outlet 214 is substantially equal to the pressure provided via the pressure control inlet 220 to the dome or chamber 224.

In addition to sealing the piston 228 to the body 210, the seals 246, 248, and 250 also serve to increase the output stability of the regulator 202. More specifically, the seals 246, 248, and 250 provide a frictional engagement with the body 210 that dampens the movements of the piston 228 in response to relatively rapid pressure changes or perturbations at the inlet 212, the pressure control input 220, and/or the outlet 214.

The substantially one-piece or unitary piston 228 further enhances stable operation of the regulator 202. In particular, unlike some known dome-loaded pressure regulators, the plug or sealing surface (e.g., the sealing surface 244) is integral with the piston or sensor 228, thereby eliminating any possibility of separation between the mechanism controlling the flow of fluid past the seat 236 and the mechanism that senses or which is exposed to and which is responsive to the pressure in the dome space 224.

The bias provided by the spring 238 causes the sealing surface 244 to sealingly contact or engage the seat 236 in the absence of a control pressure in the dome space 224 (e.g., zero pounds per square inch gauge). In this manner the regulator valve 206 is configured as a normally-closed device. Additionally, the regulator valve 206 provides a positive (e.g., self-healing) seal design. For example, if the seat 236 develops a leak from debris or any imperfection associated with the sealing surface 244 and/or the seat 236, the pressure at outlet 214 will increase and apply a greater force on the shoulder 242 and the surface 260 of the piston 228 to drive the sealing surface 244 against the seat 236. In the case where the seat 236 is made of a relatively softer material (i.e., softer than the surface 244 of the piston 228) such as, for example, plastic, the seat is deformed and/or conforms to accommodate the imperfection, debris, etc. to seal against the surface 244. Once deformed or conformed to the surface 244, the leakage past the seat 236 is substantially reduced or eliminated.

The second pressure reducing regulator 204 and valve 208 is formed using the same components as those used for the first regulator 202 and, thus, the second regulator 204 and its valve 208 are not described in greater detail herein. Additionally, although not shown, safety or relief valves may be added to the outlets 214 and 216 of the regulators 202 and 204, and an inlet filter may be placed in the inlet 212 to prevent debris from reaching the valves 206 and 208 and, in particular, the valve seats (e.g., the seat 236). It should be noted that the pressures in the dome spaces (e.g., 224) of the regulators 202 and 204 do not have to be equal (i.e., the regulators may receive different pilot or control pressures and, thus, different output pressures). Likewise, the fluid restrictors (e.g., 226) may be sized or configured similarly or differently to achieve desirable fill and/or bleed rates.

Further, it should be understood that while the example pressure reducing regulator 200 of FIG. 2 includes two pressure reducing regulators, alternative designs may include only one such regulator or more than two regulators to suit a particular application. In one alternative example, an additional regulator may be bolted or otherwise fixed to the regulator 200. In that case, an additional inlet port connects to the inlet of the added (e.g., third) regulator and the outlet of the additional (e.g., third) regulator feeds pressure to the domes (e.g., the dome space 224) of the regulators 202 and 204. Alternatively, the outlet of the added regulator may feed solenoids, which would serve to control the pressure in the domes (e.g., the dome space 224).

In addition to providing a highly stable output pressure, the configuration of the example regulator 200 eliminates the need for several fittings such as, for example, elbows, tees, etc. in comparison to known multiple outlet pressure reducing regulators. In addition, the example regulator 200 has a relatively smaller overall size and is lighter weight in comparison to known multiple output regulators. Still further, the example regulator 200 has relatively few internal parts and, thus, the cost of the example regulator 200 may be lower and the reliability may be higher than known multiple output regulators.

Although certain apparatus, methods, and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A pressure regulator, comprising:
   a body having a pressure inlet and first and second pressure outlets; and
   first and second pressure regulating valves disposed in the body and fluidly coupled to the pressure inlet and the respective first and second pressure outlets, wherein each of the first and second pressure regulating valves includes a piston having a transverse bore defining a fluid path through the piston to fluidly couple the pressure inlet to the respective pressure outlet, each of the pistons having a first portion to receive a control pressure and a second portion fixed to the first portion and configured to sealingly engage a valve seat.

2. A pressure regulator as defined in claim 1, wherein each of the pistons includes a plurality of sealing rings configured to frictionally engage the body.

3. A pressure regulator as defined in claim 1, wherein the first portion of each of the pistons is fluidly coupled to its respective control pressure via a respective fluid restrictor.

4. A pressure regulator as defined in claim 1, wherein each of the pistons is springably biased toward engagement with its respective valve seat.

5. A pressure regulator as defined in claim 1, wherein each of the pistons is made of substantially one-piece of material.

6. A pressure regulator, comprising:
   a body having a pressure inlet and first and second pressure outlets;
   a first dome-loaded pressure regulating valve fluidly coupled to the pressure inlet, the first pressure outlet, and a first control pressure, wherein the first dome-loaded pressure regulating valve comprises:
      a first piston having a transverse bore defining a fluid path through the first piston to fluidly couple the pressure inlet to the first pressure outlet and configured to engage a first valve seat and to respond to the first control pressure to control the flow of fluid between the pressure inlet and the first pressure outlet via the first valve seat; and a second dome-loaded pressure regulating valve fluidly coupled to the pressure inlet, the second pressure outlet, and a second control pressure.

7. A pressure regulator as defined in claim 6, wherein the second dome-loaded pressure regulating valve comprises a second piston having a transverse bore defining a fluid path through the second piston to fluidly couple the pressure inlet to the second pressure outlet and configured to engage a second valve seat and to respond to the second control pressure to control the flow of fluid between the pressure inlet and the second pressure outlet via the second valve seat.

8. A pressure regulator as defined in claim 6, wherein the first piston is springably biased toward engagement with the first valve seat.

9. A pressure regulator as defined in claim 6, wherein the first piston is a substantially unitary member.

10. A pressure regulator as defined in claim 6, wherein the first piston comprises a passage having an annular surface to engage the first valve seat.

11. A pressure regulator as defined in claim 6, wherein the first pressure outlet is not coaxially aligned with the pressure inlet.

12. A pressure regulator as defined in claim 6, wherein a surface of the first piston is fluidly coupled to the control pressure via a fluid restrictor.

13. A pressure regulator as defined in claim 6, further comprising a fluid restrictor serially interposed in a fluid path fluidly coupling the first control pressure to a chamber in which the first piston is at least partially positioned.

14. A pressure regulator as defined in claim 6, wherein the first piston comprises a central bore having an annular surface configured to sealingly engage the first valve seat.

15. A pressure regulator as defined in claim 6, further comprising a plurality of sealing rings engaged with the first piston.

16. A pressure regulator as defined in claim 15, wherein one or more of the sealing rings are to dampen a movement of the first piston in response to a rapid change in the first control pressure.

17. A pressure regulator, comprising:
a body having a pressure inlet and first and second pressure outlets;
a first dome-loaded pressure regulating valve fluidly coupled to the pressure inlet, the first pressure outlet, and a first control pressure, wherein the first dome-loaded pressure regulating valve comprises:
a first piston to control a flow of fluid between the pressure inlet and the first pressure outlet in response to the first control pressure, the piston defining a bore that is not axially aligned with a longitudinal axis of the first piston to fluidly couple the pressure inlet and the first pressure outlet; and
a second dome-loaded pressure regulating valve fluidly coupled to the pressure inlet, the second pressure outlet, and a second control pressure.

18. A pressure regulator as defined in claim 17, wherein the second dome-loaded pressure regulating valve comprises a second piston to control a flow of fluid between the pressure inlet and the second pressure outlet in response to the second control pressure, the piston defining a bore that is not axially aligned with a longitudinal axis of the second piston to fluidly couple the pressure inlet and the second pressure outlet.

19. A pressure regulator as defined in claim 17, wherein the bore comprises a transverse bore.

20. A pressure regulator as defined in claim 17, wherein the first piston is configured to engage a first valve seat to control the flow of fluid between the pressure inlet and the first pressure outlet.

21. A pressure regulator as defined in claim 20, wherein the first piston comprises a passage having an annular surface to engage the first valve seat.

22. A pressure regulator as defined in claim 17, wherein a surface of the first piston is fluidly coupled to the first control pressure via a fluid restrictor.

23. A pressure regulator as defined in claim 17, further comprising a plurality of sealing rings engaged with the first piston, wherein one or more of the sealing rings are to dampen a movement of the first piston in response to a rapid change in the first control pressure.

* * * * *